United States Patent
Markert

(10) Patent No.: US 12,470,666 B1
(45) Date of Patent: Nov. 11, 2025

(54) SYSTEMS AND METHODS TO ADD CONTENT TO A VIDEO STREAM

(71) Applicant: SportSight, LLC, Stillwater, MN (US)

(72) Inventor: Stephen M. Markert, Stillwater, MN (US)

(73) Assignee: SPORTSIGHT, LLC, Stillwater, MN (US)

( * ) Notice: Subject to any disclaimer, the term of this patent is extended or adjusted under 35 U.S.C. 154(b) by 759 days.

(21) Appl. No.: 16/847,904

(22) Filed: Apr. 14, 2020

Related U.S. Application Data

(63) Continuation-in-part of application No. 16/504,434, filed on Jul. 8, 2019, now Pat. No. 10,623,688, which is a continuation of application No. 14/052,643, filed on Oct. 11, 2013, now Pat. No. 10,349,001.

(60) Provisional application No. 61/712,594, filed on Oct. 11, 2012.

(51) Int. Cl.
| | |
|---|---|
| *H04N 5/91* | (2006.01) |
| *G11B 27/10* | (2006.01) |
| *G11B 31/00* | (2006.01) |
| *H04N 5/77* | (2006.01) |

(52) U.S. Cl.
CPC .............. *H04N 5/91* (2013.01); *G11B 27/10* (2013.01); *G11B 31/006* (2013.01); *H04N 5/77* (2013.01)

(58) Field of Classification Search
USPC .................................................. 386/221–228
See application file for complete search history.

(56) References Cited

U.S. PATENT DOCUMENTS

| | | | | |
|---|---|---|---|---|
| 7,796,155 | B1 * | 9/2010 | Neely, III | G06T 19/006 348/157 |
| 9,032,296 | B1 * | 5/2015 | Jeffs | H04N 21/4622 715/719 |
| 10,226,698 | B1 * | 3/2019 | Lockton | A63F 13/46 |
| 2004/0073437 | A1 * | 4/2004 | Halgas, Jr. | H04N 21/235 715/723 |
| 2004/0243922 | A1 * | 12/2004 | Sirota | G06Q 10/109 715/233 |
| 2004/0268413 | A1 * | 12/2004 | Reid | H04N 21/4532 725/131 |
| 2007/0280638 | A1 * | 12/2007 | Aoki | H04N 5/765 386/231 |
| 2007/0288951 | A1 * | 12/2007 | Ray | H04H 60/37 725/23 |
| 2008/0129825 | A1 * | 6/2008 | DeAngelis | A63B 24/0021 348/169 |

(Continued)

FOREIGN PATENT DOCUMENTS

WO  WO-0193590 A2 * 12/2001 ......... H04N 21/4781

*Primary Examiner* — Nigar Chowdhury
(74) *Attorney, Agent, or Firm* — FisherBroyles, LLP; W. Scott Harders

(57) ABSTRACT

Systems and methods are disclosed including systems to receive a tagging signal initiated by a user interacting with a device that displays icons corresponding to potential events that may occur in the area of interest. Systems detect an identifiable feature occurring in the area and generate a feature tag based on the detected identifiable feature. Systems arrange the tagging signal, the feature tag and the video stream together into a combined event stream so users may enter desirable tagging signals and/or tags and view portions of the combined event stream having the desirable characteristics.

19 Claims, 11 Drawing Sheets

(56) References Cited

U.S. PATENT DOCUMENTS

| | | | |
|---|---|---|---|
| 2009/0082110 A1* | 3/2009 | Relyea | A63F 13/213 463/42 |
| 2009/0210395 A1* | 8/2009 | Sedam | H04W 4/00 |
| 2009/0228279 A1* | 9/2009 | Kephart | H04N 21/8106 704/E21.001 |
| 2009/0228798 A1* | 9/2009 | Kephart | G11B 27/034 707/999.102 |
| 2009/0228928 A1* | 9/2009 | Lee | H04N 21/435 725/55 |
| 2009/0254843 A1* | 10/2009 | Van Wie | G06F 3/0482 715/757 |
| 2010/0179867 A1* | 7/2010 | Hughes | A63F 13/00 705/14.5 |
| 2010/0195623 A1* | 8/2010 | Narasimhan | H04L 65/605 370/332 |
| 2010/0257212 A1* | 10/2010 | Polumbus | G11B 27/031 707/803 |
| 2011/0022471 A1* | 1/2011 | Brueck | G06Q 30/02 705/14.61 |
| 2011/0141357 A1* | 6/2011 | Price | H04N 21/41 348/552 |
| 2011/0154200 A1* | 6/2011 | Davis | H04N 21/8133 715/716 |
| 2012/0030263 A1* | 2/2012 | John | G06F 16/48 707/825 |
| 2012/0030292 A1* | 2/2012 | John | H04N 21/25891 709/206 |
| 2012/0072845 A1* | 3/2012 | John | G06F 16/48 715/738 |
| 2012/0087588 A1* | 4/2012 | Carter | G06K 9/00724 382/190 |
| 2012/0093481 A1* | 4/2012 | McDowell | G11B 27/28 386/241 |
| 2012/0110455 A1* | 5/2012 | Sharma | G06Q 10/101 715/719 |
| 2012/0169742 A1* | 7/2012 | Baxter | H04L 69/161 345/501 |
| 2012/0219271 A1* | 8/2012 | Vunic | G06K 9/00765 386/278 |
| 2012/0250950 A1* | 10/2012 | Papakipos | G06K 9/00288 382/118 |
| 2012/0263430 A1* | 10/2012 | Spitzer-Williams | G11B 27/034 386/224 |
| 2013/0029735 A1* | 1/2013 | Hormigo Cebolla | H04N 21/2187 463/4 |
| 2013/0081082 A1* | 3/2013 | Riveiro Insua | H04N 21/8549 725/38 |
| 2013/0083003 A1* | 4/2013 | Perez | A63F 13/79 345/419 |
| 2013/0151969 A1* | 6/2013 | Campbell | G06F 16/748 715/720 |
| 2013/0159858 A1* | 6/2013 | Joffray | H04N 21/4307 715/719 |
| 2013/0222583 A1* | 8/2013 | Earnshaw | H04N 21/47202 348/143 |
| 2013/0326406 A1* | 12/2013 | Reiley | G06F 3/048 715/810 |
| 2014/0033081 A1* | 1/2014 | Fernandez | G06F 16/9535 715/760 |
| 2014/0089449 A1* | 3/2014 | Bhogal | H04L 67/1097 709/213 |
| 2014/0101550 A1* | 4/2014 | Zises | G11B 27/105 715/721 |

\* cited by examiner

SYSTEMS AND METHODS TO ADD CONTENT TO A VIDEO STREAM

This application is a continuation in part, and claims priority to, application Ser. No. 16/054,434, filed Jul. 8, 2019, now U.S. Pat. No. 10,623,688 which is a continuation of and claims priority to Ser. No. 14/052,643 filed Oct. 11, 2013, now U.S. Pat. No. 10,349,001, which claims priority to provisional application Ser. No. 61/712,594 filed Oct. 11, 2012.

The systems and methods described below are intended to capture and provide video manipulation and replay from sports venues, arenas, concert and performance halls and/or multi-purpose rooms. It provides raw audio and video as well as tools to make use of these captured videos. In certain embodiments, the system and methods outlined below offer event or game telestration, event or game categorization and event or game high-light tools. Instead of individuals trying to record a sports event from the sideline of a game in the stands, they may be provided with high quality video shot from overhead fixed camera systems that will capture all events in a facility and allow that raw footage to be manipulated or watched. Additional processing may include coaching overlays, live tagging, time stamping, contextual event information including clock, score, progress, situation, event summary and the like. Further processing may include collection of user fees, inserting advertising and collecting revenue, conducting sales of event data or images from an event, and managing an organization such as a team or league with tools including email, scheduling, calendaring and the like. Users may include sports teams, individual players, coaches, family members, talent scouts, or even general public or news organizations who want to view an event in whole or in part.

Users may access all practice and event sessions. Coaches, for example, may be able to utilize the video to show players from a "Birds eye view" perspective how to position themselves on the field, court, or rink. They will be able to use the telestrator tools, along with game or event breakdown features, to help their teams achieve excellence.

Other users, such as a family member will never miss a n event again, as they will have live video feed to every event. For example, if Dad is away on business, all he will have to do is log in and be able to see the game or event live as it occurs using a PC, phone, or tablet device. Families will also be able to capture the video and make season or career "highlight" reels for their child's pleasure or for use in the sports recruiting process.

In one embodiment, the operation begins with establishing preferably long term lease deals with owners of sports venues. Most of these owners will be either cities or school districts but it is appreciated that these venues as described here may be privately owned. Exemplary venues include but are not limited to the following:

Basketball Courts.
Volleyball courts
Ice Rinks
Dome facilities
Tennis courts
Racquetball courts
Swimming pools
Baseball fields.
Football fields.
Lacrosse fields
Soccer fields
Rugby pitches.
Gymnasiums.
Theatres In an embodiment, these facilities may enjoy additional revenue streams from the systems and methods described. Once the leases are established, organizations who utilize the venue may be targeted for services. In other embodiments the services may be provided by the facility as a feature or to participants or teams on a pay as you go arrangement.

The system and methods described provide a service to sports teams, performers, actors and the like. For example, coaches will have a tool to visually show their players either what they did correctly or what areas they need to improve upon. This type of review is only available today to either colleges or high-end high schools, and is only available to them because they take their own video and then manually review and compile "films" for player review.

The following detailed description, which references and incorporates the Figures, describes and illustrates one or more specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

Figure 1:
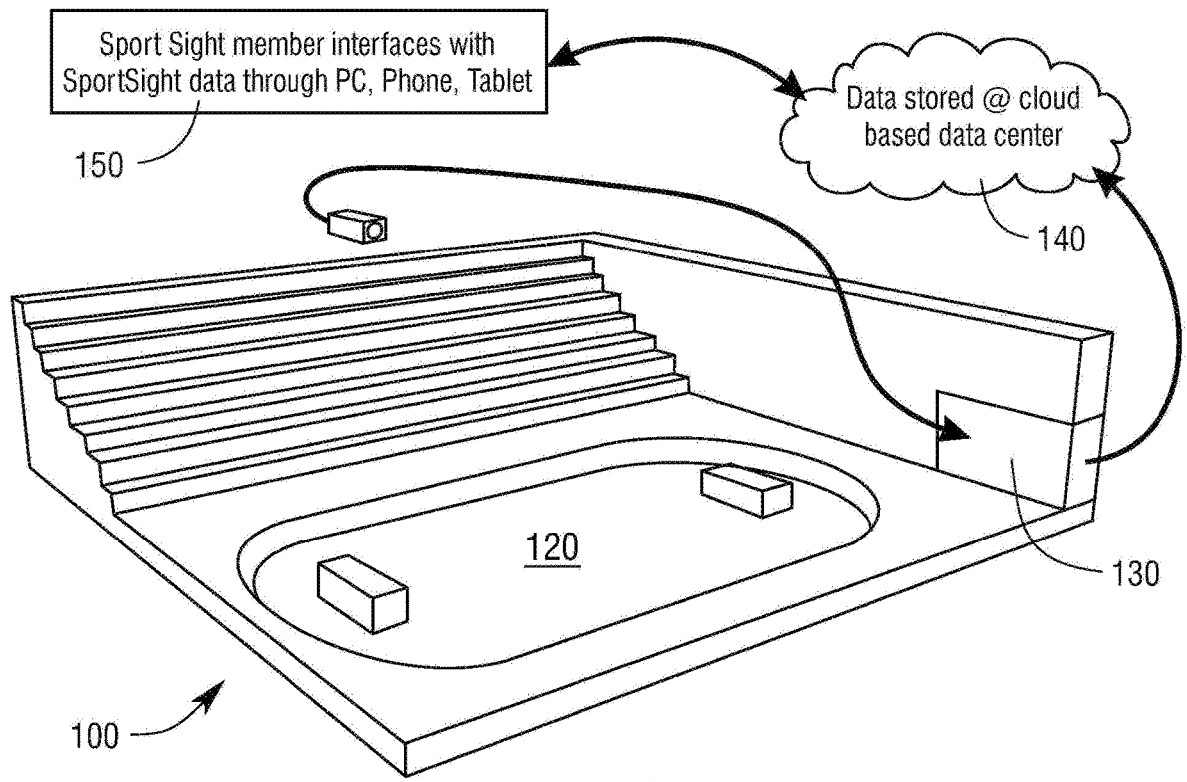
FIG. 1 is a simple, high level, schematic diagram of a system according to an embodiment of the disclosure.

Referring now to FIG. 1, a system 100 includes at least one camera 110 positioned in view of an area of interest 120 such as the arena illustrated. In one embodiment, the at least one camera 110 includes a high-definition digital or mega-pixel camera. In other embodiments, cameras may include those of individual spectators or photographers in the area of interest 120 that can be linked or registered with the system 100. Event images are captured by the cameras 110. The system may optionally include at least one microphone (not shown) to provide an audio track to the capture. The cameras 110 and microphone if installed are in turn operatively connected to a control center 130. The operative connection may be hard-wired, wireless or a combination. In one embodiment, at least initial image and sound processing may occur in control center 130. Examples of such processing include, attaching identifying markers, such as location, date, time, event identifier, teams, and the like. Processing may further include synchronizing or "stitching" video and audio tracks from any or all of the video tracks (one per camera for example) and audio tracks (one per microphone for example) or images from any associated still camera(s). Synchronizing can be accomplished in real-time as the data streams arrive and/or may be refined manually or using timing signals from internal or external sources such as a game clock, GPS or other clocking mechanisms. Additional processing may further include overlaying telestration graphics, videos, play book overlays and/or other interactive coaching tools. As used here, "telestration" includes all forms of additional, visual supplement of video streams or still images. This includes additional video streams, static overlays or offset presentation such as playbook, hand-drawn or other "line art" or graphical depiction, highlighting and the like. Further processing may include compression, encrypting or other encoding, and preparation for live streaming such as adjusting file size to optimize a streaming experience.

In another embodiment, control center 130 does no meaningful processing and merely acts as a conduit to an off-site data center 140. Processing not accomplished on-site or additional processing may occur in the off-site data center 140. Examples of additional processing may include all the processing discussed above with respect to control center 130 as well as inserting advertising, collecting viewer fees, interfacing with internet-based, satellite, cable or over the air television programming, permitting user selection of particular video and audio feeds for individualized video production and the like.

Regardless of control center location, users desiring to access raw or produced audio, video and/or images may access the data center 130 or 140 or both using any of a variety of fixed or mobile tools such as computers, smart phones, tablets, connected televisions or other A/V playback equipment 150 or any device capable of displaying content. While we currently envision the two distinct data centers 130, 140 described, artisans will appreciate that the functions of both may be combined into one whose physical location is unimportant and may be allocated locally or centrally, or the functions of both may be further divided and dispersed over additional or redundant centers depending on for example, location and viewing area of interest.

Figure 2:
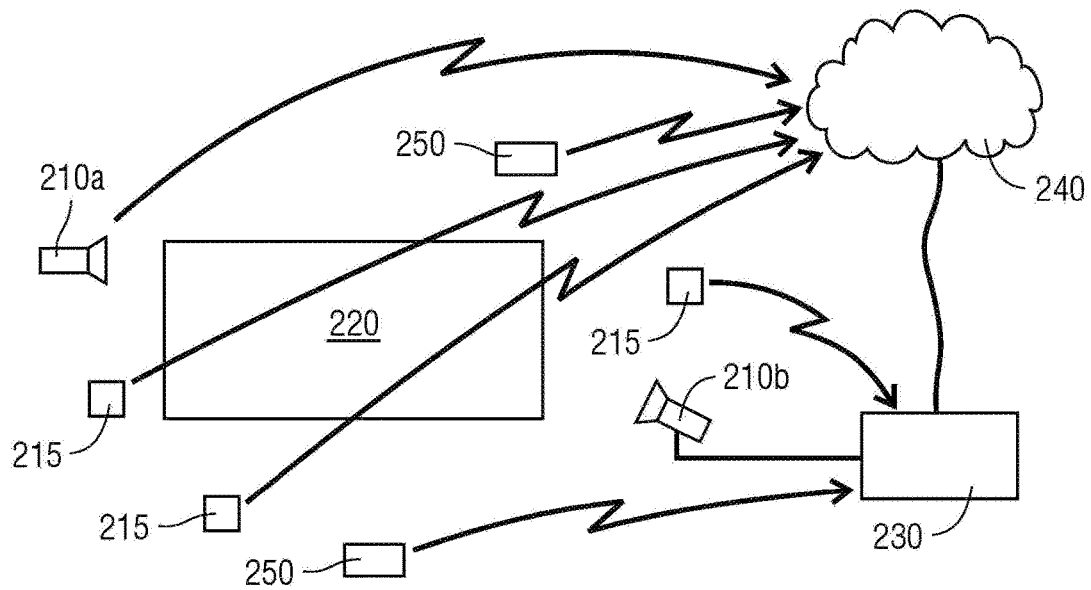
FIG. 2 is a simple, high level, schematic diagram of a system according to an embodiment of the disclosure

With reference to FIG. 2, in another embodiment, a real-time capture system 200 may include a plurality of cameras 210a, 210b mounted or fixed in view of an area of interest 220. In one embodiment, additional cameras 215 or audio recording devices or both may include those of individual spectators or photographers near in the area of interest 220 provided those devices can be linked or registered with the system 200. Event images and audio may be captured by the cameras 210 and the spectator cameras 215 and provided directly to an off-site or cloud based processor 240 or processors. Alternately, the video and audio data may be provided to on-site processors or to an uplink processor 230 for routing to off-site processors 240. The system may further include an instructor or coach tagging apparatus 250 for providing real-time markers synchronized with the video and/or audio tracks. For example, an assistant coach may be tasked with keeping track of desired activities such as shots on goal, saves, ground balls, interceptions, home runs or any other statistic. The apparatus 250 may be configured as an app for a phone or tablet computer or as a stand-alone record keeping device with a user interface configured to enable real-time record keeping. In another embodiment, the apparatus 250 may be configured with a microphone or as a head-set and record real-time verbal coaching cues such as missed assignment, off-sides, great defensive play and the like and include player number. This may facilitate team debriefing or individual player review of their performance.

Figure 3:
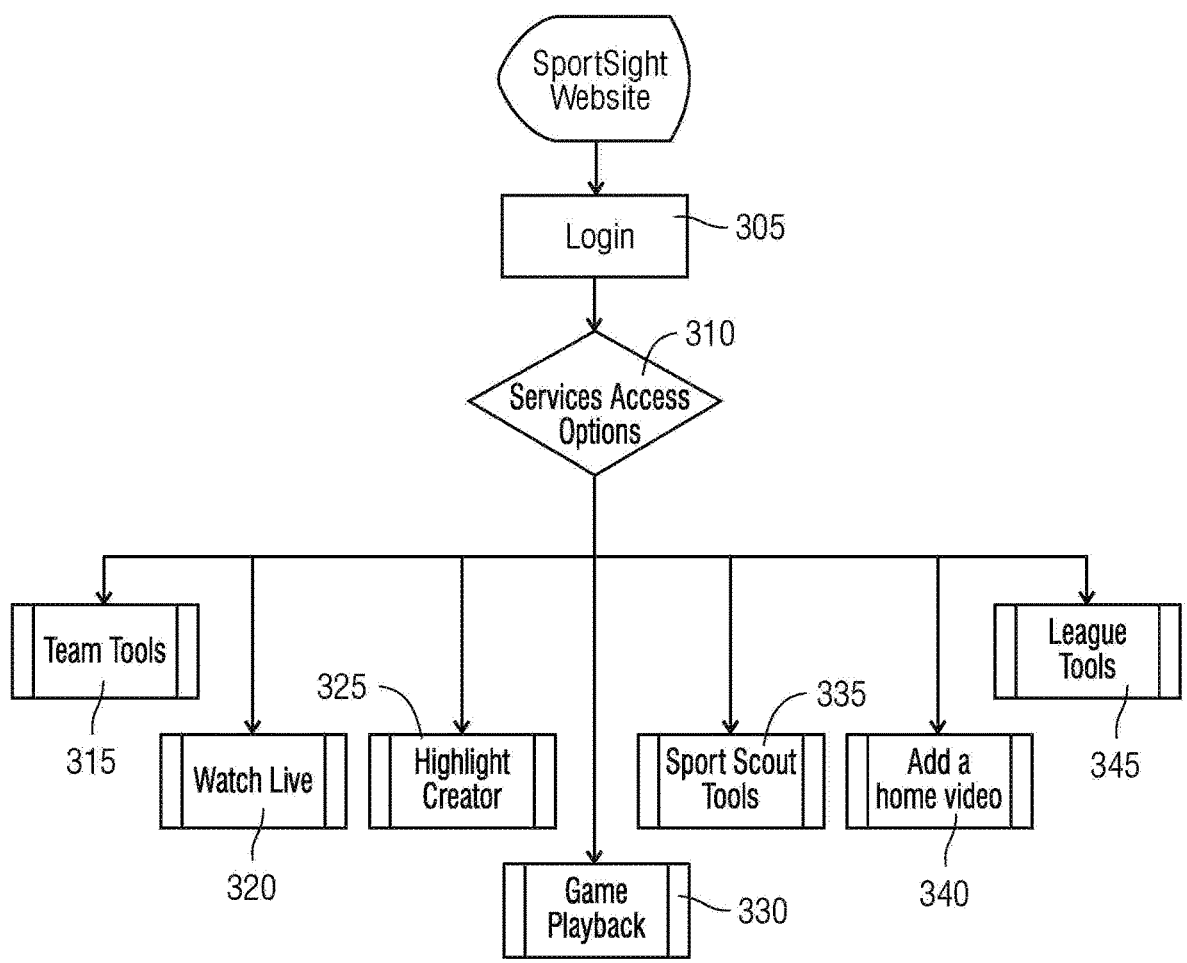
FIG. 3 is a flow diagram of a basic flow of a system according to an embodiment of the disclosure.

FIG. 3 is a schematic diagram of one embodiment of the basic flow of an embodiment of a system described as "SportSight." The Member begins by selecting a language in which the remainder of the exchange with the website will take place.

Users will log into the SportSight website 305 and make a selection 310 for the desired service offering. SportSight offerings ma y include:
Team Tools 315
Watch Live! 320.
Highlight creator 325
Event playback 330.
Talent Scout tools 335.
Add a home video 340
League organization and control tools 345
as more completely discussed below.

Figure 4:
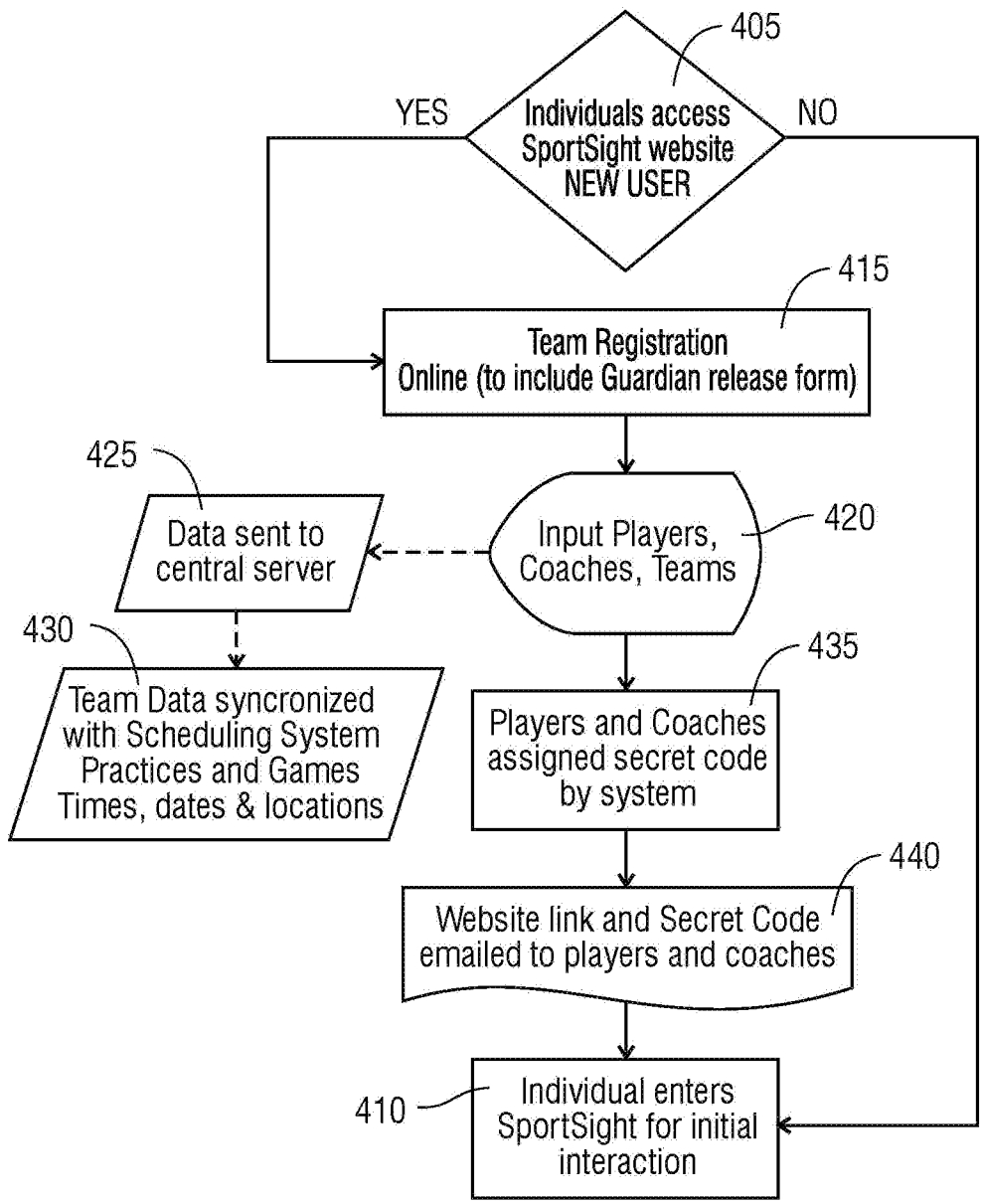
FIG. 4 is a flow diagram of one embodiment of a new user or member registration process.

FIG. 4 is a schematic diagram of one embodiment of the New user or member registration process. Initially, the system may ask whether the individual is a first time visitor, 405. If the individual is not a first time visitor, they will be asked to sign-in 410 for example with a unique member number as well as some member authorization data (such as birth day and birth month, but this is only an example). The next step for an existing member would be for them to select the service offering to utilize (FIG. 3).

If the individual is a first time visitor they will directed to the registration page 415, where we will gather the necessary registration information. The user may then be afforded the opportunity to enter team information, event participants, and the like, 420. The registration information and input data may be stored 425 in a cloud-based off-site data center or central server, and periodically synchronized 430. The system may assign the team and or the individual a unique member number 435. The system will then send the new member an email welcoming them as a customer and indicating their unique member number 440. At this point the new member will be given the option to select a service offering (FIG. 3).

Figure 5:
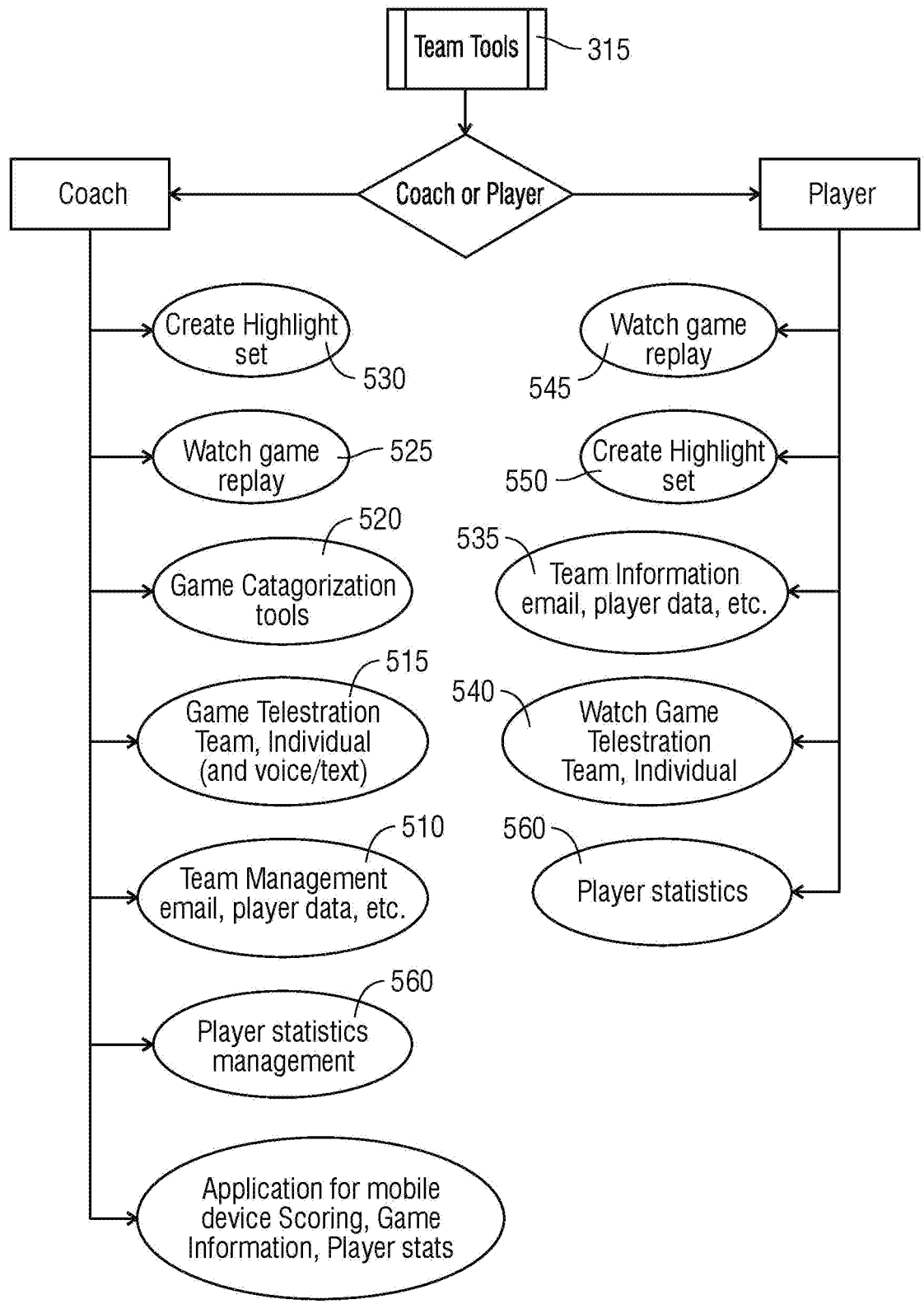
FIG. 5 is a flow diagram of one embodiment of an aspect of the disclosure.

FIG. 5 is a schematic diagram of one embodiment of the process flow of the use of the Team Tools 315 service offering. Access control may be determined by the unique member number entered by the member during sign-in, for example in FIG. 4.

Coaches will be able to choose from a menu of available options. The options available to coaches may include team management 510, event telestration 515, event categorization 520, event replay 525, and highlight creation 530.

Team management 510 will allow the member to change or access critical team information including, player and coach personal information, team practice and game schedules, team email function, etc.

Event telestration tools 515 will allow a coach to graphically indicate to an individual or the team how a play sequence should have evolved. The coach will be able to include verbal comments as the telestrated play evolves as well as overlaying or juxtaposing other audio, video or still images, for example, from a playbook or other event.

Event categorization tools 520 will allow a coach to segment an event into clips of like types of events. Examples may include, offensive vs. defensive plays, all scoring plays, and all plays by a particular player or position on the field. Player identification may be computer aided by processing such as face recognition, identifying numbers, GPS, RFID technology or similar worn by the players to assist coaches with this process.

Watch event replay 525 allows a coach to select and watch a previously recorded event.

Highlight creator tools 530 will allow a coach the ability to create a "scrapbook" of greatest moments for a team or an individual. The GPS, RFID technology or similar worn by player will assist coaches with this process. Alternately, coach or spectator marking or tagging either via a tagging apparatus or audio tags (as further discussed below) may identify players by number, name, position, etc. when involved in key moments.

The identification or similar technology could be used in conjunction with personal performance monitors (e.g. Mi Coach) to aide coaches, trainers and players in analyzing, and enhancing player performance and early detection of injuries such as strains, concussions and the like.

With continued reference to FIG. 5, the options available to players include team information 535, event telestration replay 540, event replay 545, and highlight creation 550.

Team information 535 will allow the players to access critical team information including, player and coach personal information (players may be able to edit their own personal information), team practice and event schedules, team email function, etc.

Event telestration tools 540 will allow players to graphically view, based on the coach's comments and drawings, how a play sequence should have evolved. Here a player may also view coach event categorizations and provide players an opportunity to view segments of an event as put together by the coaching staff 520. Examples may be offensive vs. defensive plays, all scoring plays, all plays by a particular player or position on the field.

Watch event replay 545 allows a player to select and watch a previously played event.

Highlight creator tools 550 will allow a player the ability to create a "scrapbook" of greatest moments for a team or an individual. The identification technology for players will assist players with this process.

Coaches may update and players may view team and personal statistics, 560. Player Statistics management will allow a subscriber to the SportSight system to tally and compare player statistics.

In another embodiment and use, the system and method may allow a designated individual who is present at a game or event to "keep the book." Essentially that individual would be able to track the progression of the game or event, e.g. inning, time, and individual player statistics.

Figure 6:
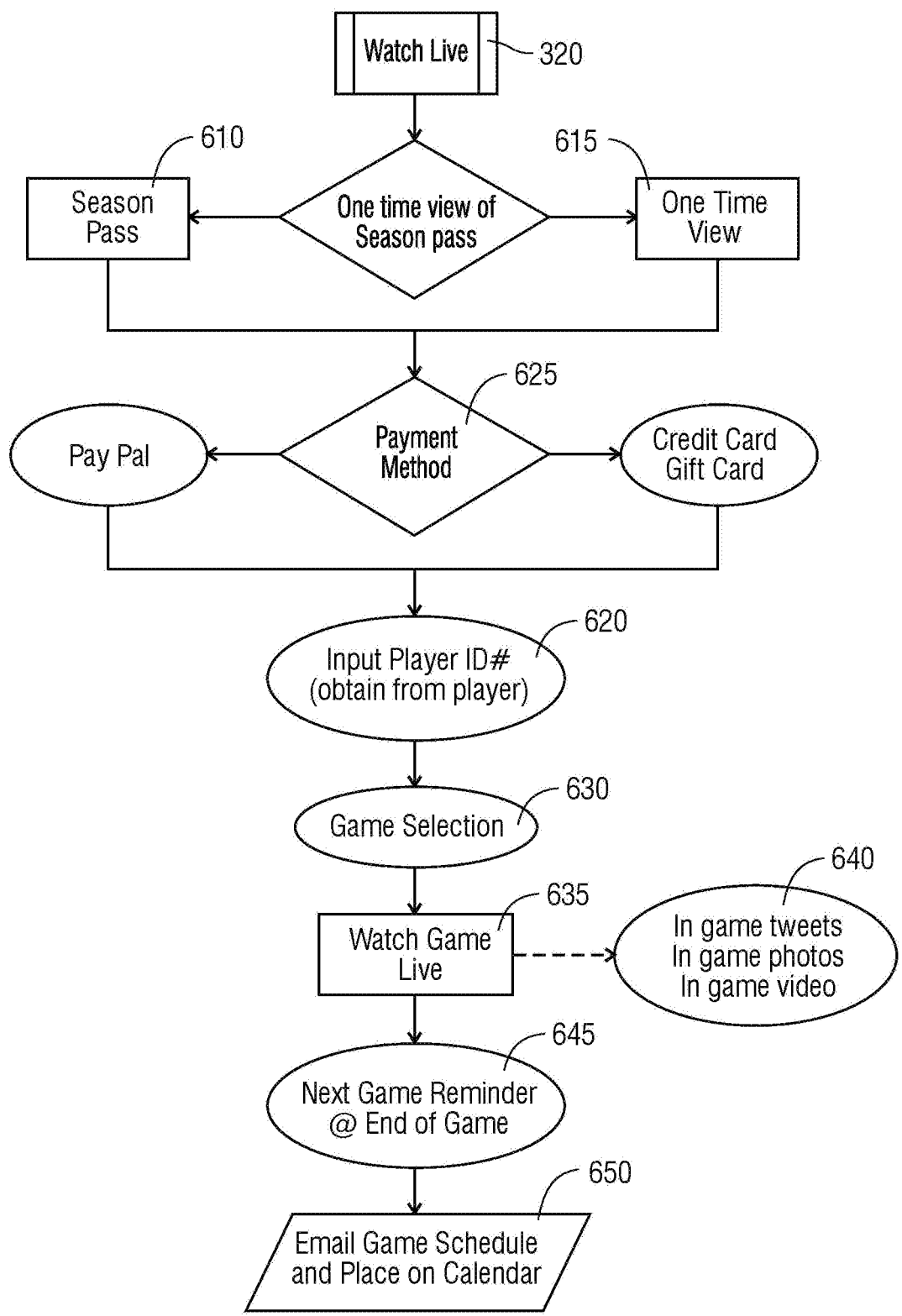
FIG. 6 is a flow diagram of one embodiment of another aspect of the disclosure.

FIG. 6 is a schematic diagram of one embodiment of the process flow of the use of the "watch live" service offering 320. When a member enters the Watch Live service offering they will either enter as an existing member 610 or as a guest 615 (one time viewer). At this point or after payment below, the viewer may be queried for a "Player Pass Code" 620. The player pass code authorizes that the player is allowing the viewer to watch the event. The viewer may then be prompted for a payment option 625, of either one time view or season pass. The viewer may then select 630 the event to watch, authorized by the player pass code if present. The viewer will then proceed to watch the event live 635. Options may be given during the event for in-event tweets, in-event photos, and in-event video 640. At the end of the event or on a scroll during the event there may be reminders of upcoming events and/or statistics or other information for the selected player or team 645. In addition the viewer may be able to download the player schedule into their calendar 650.

Figure 7:
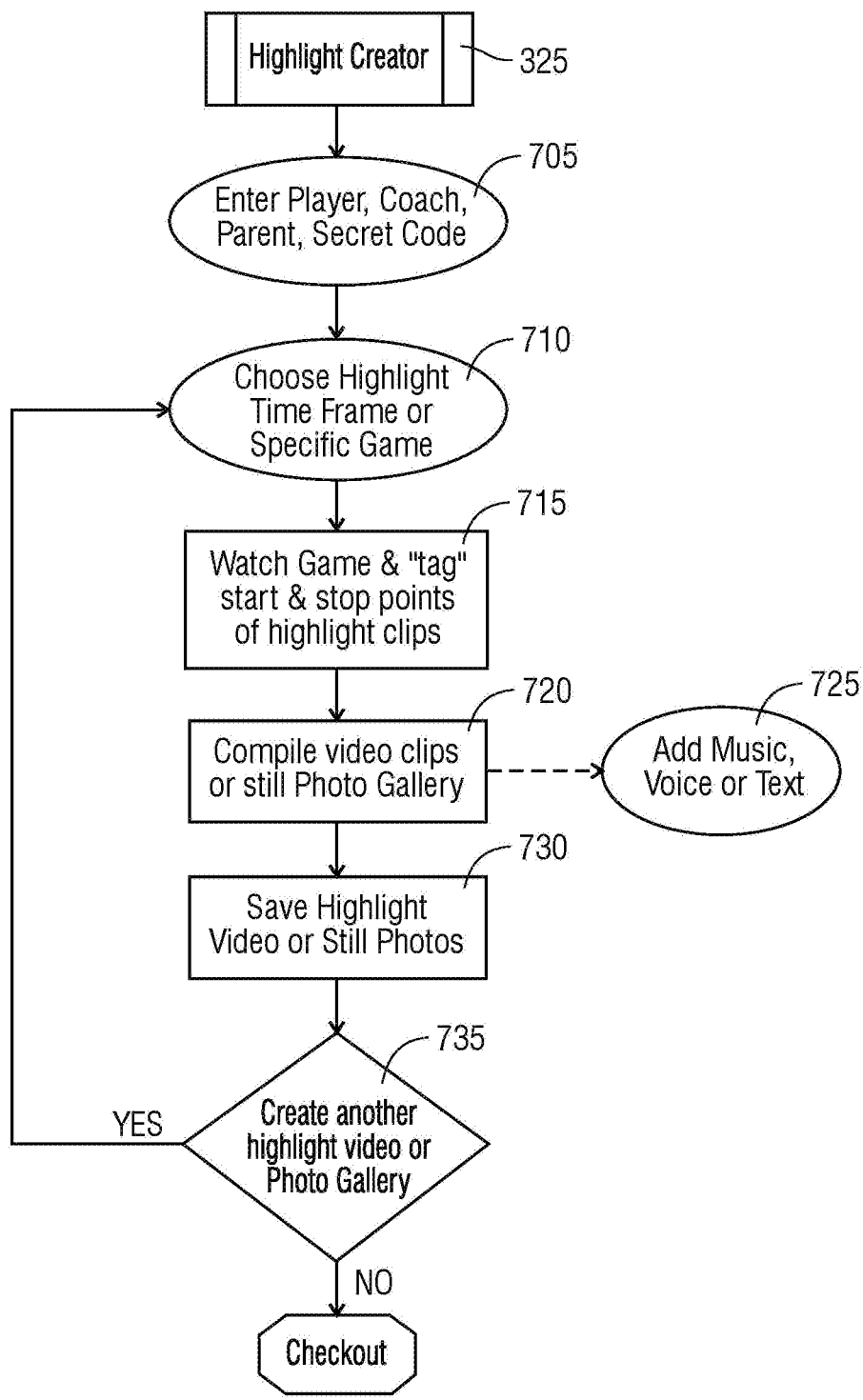
FIG. 7 is a flow diagram of one embodiment of another aspect of the disclosure.

FIG. 7 is a schematic diagram of one embodiment of the process flow of the use of the "highlight creator" service offering 325. After entering the system through a web site or app for example, the user may enter authorization credentials such as a player or coach pass code 705. The user will then be able to select a desired event such as by entering a range of dates from which to create the highlight video 710. With the assistance of the player identification technology or tagging, only those segments of the events where the player is on the "field" may be made available. This can greatly reduce the amount of film to watch. The user may "clip" those portions of the event to incorporate into the highlight video, 715, by identifying start and stop times or frames, highlighting a particular video sequence or otherwise tagging periods desirable to include in a highlight or summary video. The user will be able to arrange the clips in any order, 720, and will have the ability to include event data, such as date, time, location, opponent, contextual information on the event such as score, situation, etc. The user may also have add voice over, text, or music to their video 725. Once complete the user may save the highlight video and or save any desired still image frames 730. The user will then be given the option to create another highlight, or checkout 735.

Figure 8:
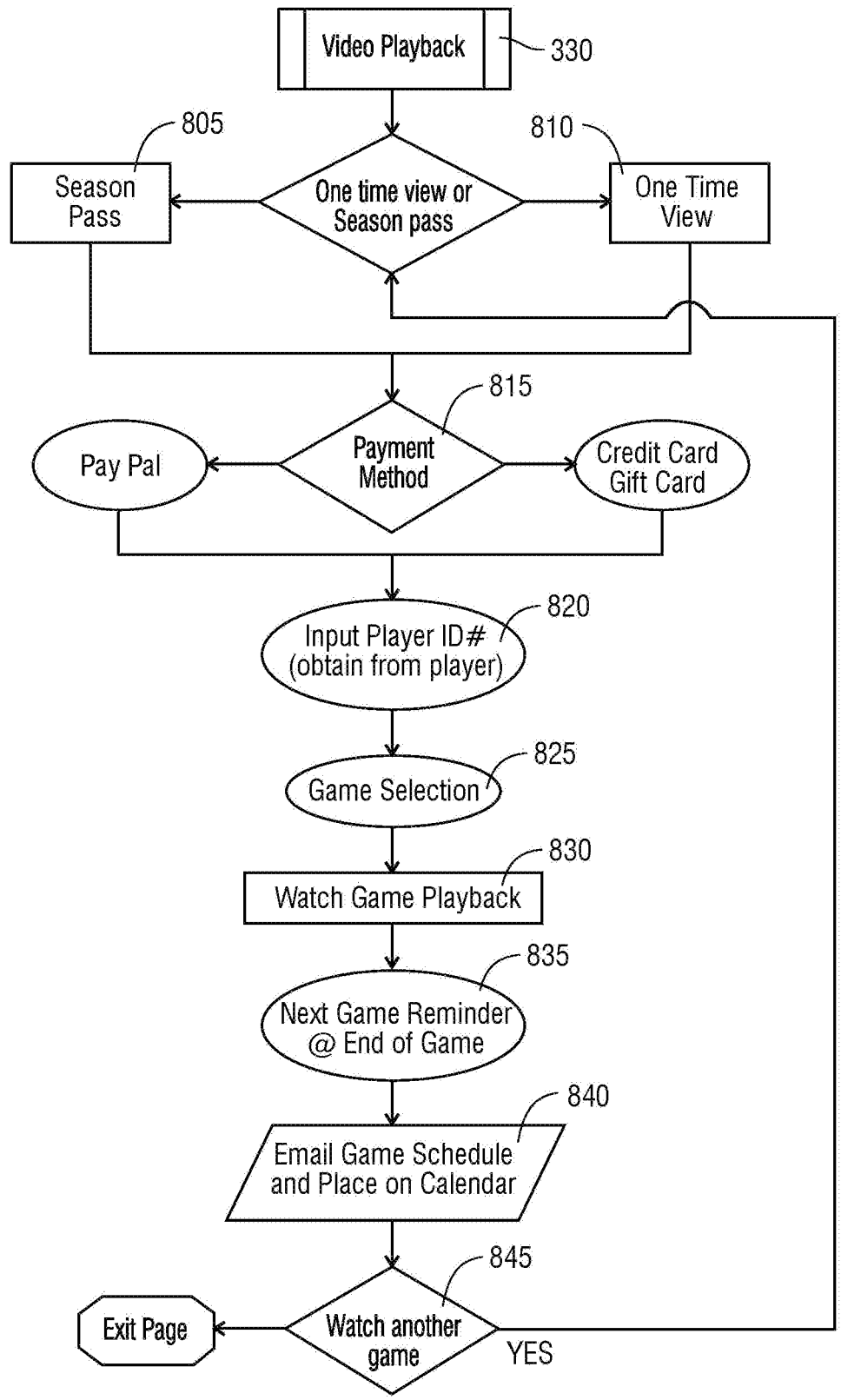
FIG. 8 is a flow diagram of one embodiment of another aspect of the disclosure.

FIG. 8 is a schematic diagram of one embodiment of the process flow of the use of the "video playback" service offering 330. In one embodiment, a member may enter the video playback service offering as an existing "season pass" member 805 or as a one-time viewer or guest 810. If needed, the user will then choose payment option 815, for one time view or season pass fees are not current. The user may also be required to enter a "Player Pass Code" as authorization or permission by the player for the user to watch the event 820. The user may then select an event to watch 825. The user will then proceed to watch the event playback 830. Options may be employed during the event playback for tweets, Facebook, or other social media updates, adding event photos and videos, or downloading purchased photos or videos. At the end of the event there may be a reminder of upcoming events for the selected player 835. In addition the viewer will be able to download the player schedule into their calendar 840. The user may then watch another event or exit the page 845.

Figure 9:
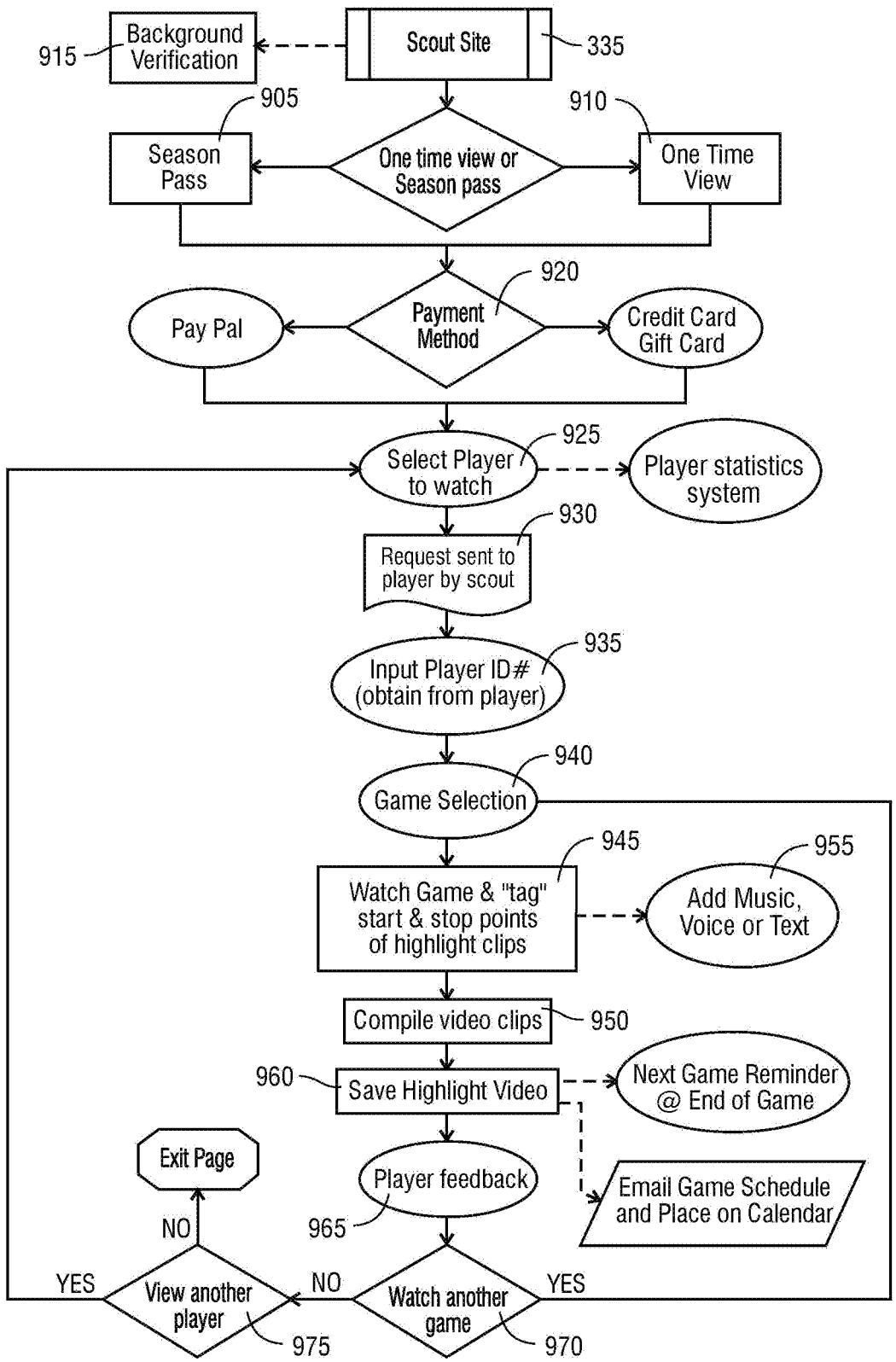
FIG. 9 is a flow diagram of one embodiment of another aspect of the disclosure.

FIG. 9 is a schematic diagram of one embodiment of the process flow of the scouting tools 335 system or service. While the process below is referred to under the example of a scout, it is appreciated that other training personnel, coaches, team trainers or individual trainers may find the access below to be beneficial. When a user enters the scouting system offering they may either enter as an existing member 905 or as a one-time viewer guest 910. Optionally, prior to granting access, scouts may apply to be added as members or viewers and their employment and background may be validated 915. As appropriate, the scout may need to enter the payment method and payment 920. In one embodiment, the scout may select a player to watch 925 and send a request to that player for permission to watch their event(s) 930. In this embodiment, if the player would not like the scout to watch them the player will decline the offer. If the player would like the scout to watch their event(s) the player will accept the scout offer and in some embodiments send the scout a player pass code. In other embodiments, the scout may already have a code and bypass the player request. The scout will enter the player pass code 935. The scout will then select the event to watch 940. When a system is so configured with player identification technology, only those segments of the events where the player is on the field may be made available. This will greatly reduce the amount of film to watch. The scout may "clip" those portions of the event to incorporate into the highlight video, 945, by identifying start and stop times or frames, highlighting a particular video sequence or otherwise tagging periods desirable to include in a highlight or summary video. The scout will be able to arrange the clips in any order, 950, and will have the ability to include event data, such as date, time, location, opponent, contextual information on the event such as score, situation, etc. The user may also add voice over, text, or music to their video 955. Once complete the scout may save the highlight video and/or save any desired still image frames 960. The scout will also have the option to provide feedback to the player 965. The scout may then be given the option to create another highlight report on that player, 970 or on another player, 975. Optionally, the scout may receive reminders of upcoming events for the selected player, or download the player schedule into the scout's calendar.

Figure 10:
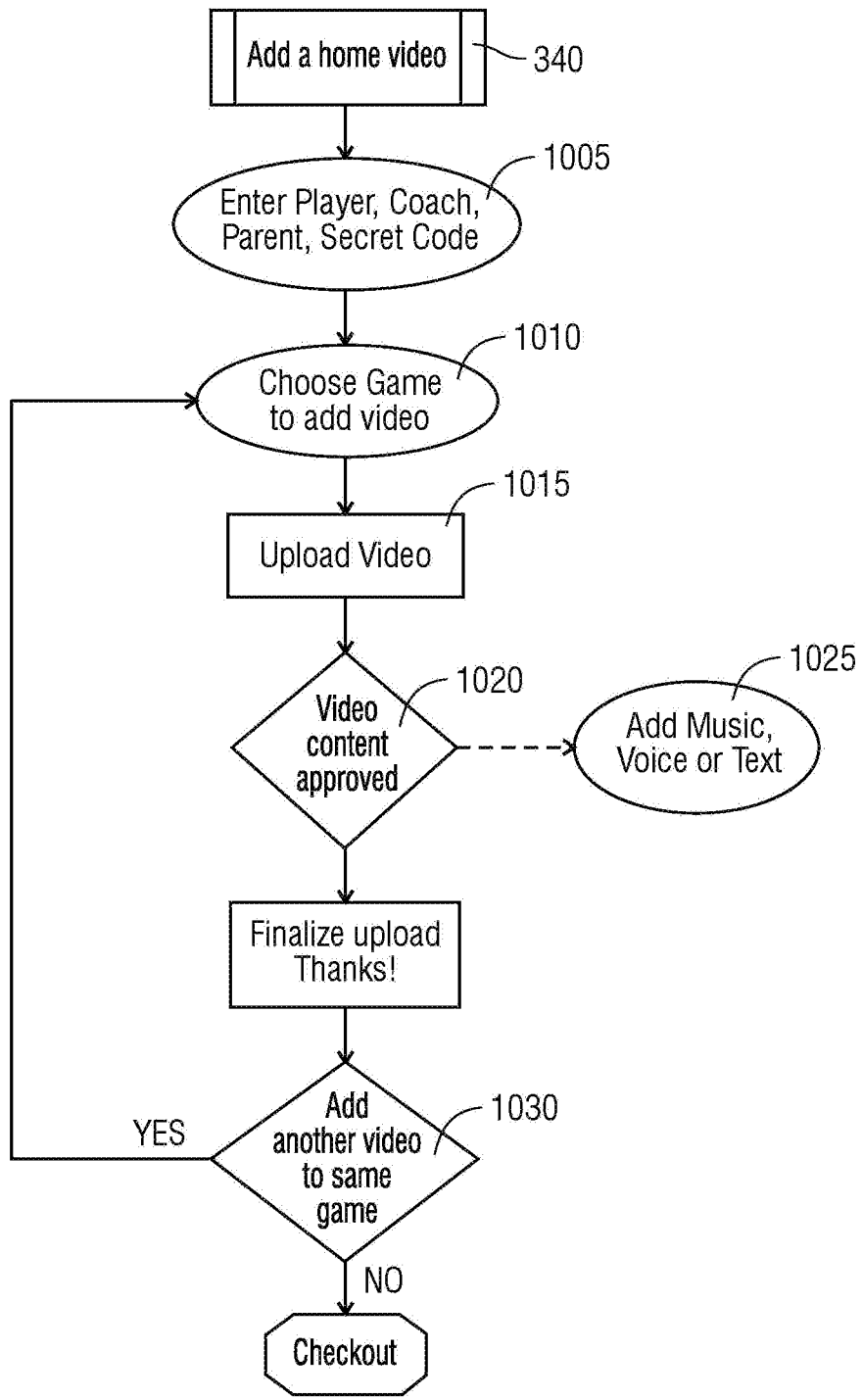
FIG. 10 is a flow diagram of one embodiment of another aspect of the disclosure.

FIG. 10 is a schematic diagram of one embodiment of the process flow of the use of the "add a home video" service offering 340. The user may enter a "Player Pass Code" 1005. The user will chose which event to which they would like to add their video 1010. The user will follow the prompts to upload their video 1015. The video content may await an approval process 1020 or be added immediately. The user may have the option to add music, voiceover and text 1025. When finalized, the user may be given the option to upload another video to the same event or select a different event to which to add a video 1030.

Figure 11:
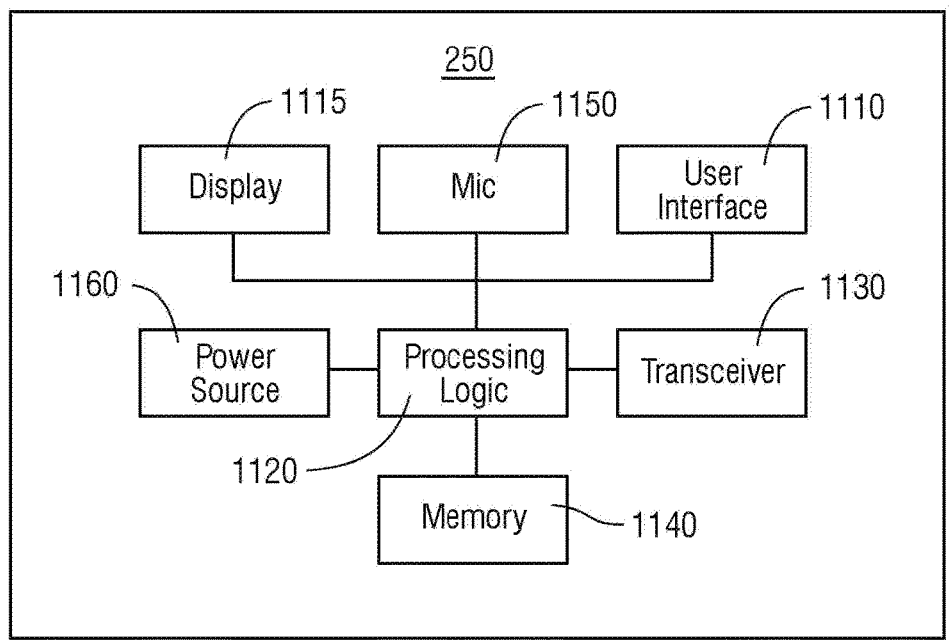
FIG. 11 is a functional block diagram of a tagging apparatus.

With reference now to FIG. 11, a simplified functional block diagram of an instructor or coaching marking apparatus 250 is illustrated. The marking apparatus 250 may be configured as an application on a smart-phone, tablet computer or stand-alone computer system in connection with or connectable to marker logic (not shown). The marking apparatus 250 includes a user interface 1110 preferably a touch screen type integrated with display 1115 and presenting an configurable set of "buttons" to record those statistics desirable, such as shots taken, player identifier, key defensive plays, score, assist and the like. Upon user input on the user interface 1110 representing the statistic, processing logic 1120 formats a marker signal for transmission through transceiver 1130 to marker logic (not shown). Optionally, processing logic 1120 may retain signals before transmission or afterwards in memory 1140. Transceiver 1130 may send the user input converted marker signal representing the statistic to be recorded (or marked) on the combined event record either wirelessly or via hard-wired connection. Optionally, the marking apparatus 250 may include a microphone 1150, or in another option it may be configured solely as a microphone, and similarly processing logic 1120 formats audio sensed by the microphone 1150 for transmission to marker logic and/or storage in memory 1140. The marking apparatus 250 may be powered 1160 via replaceable or rechargeable battery or by hard-wired or plug in type connection to a power source.

Figure 12:
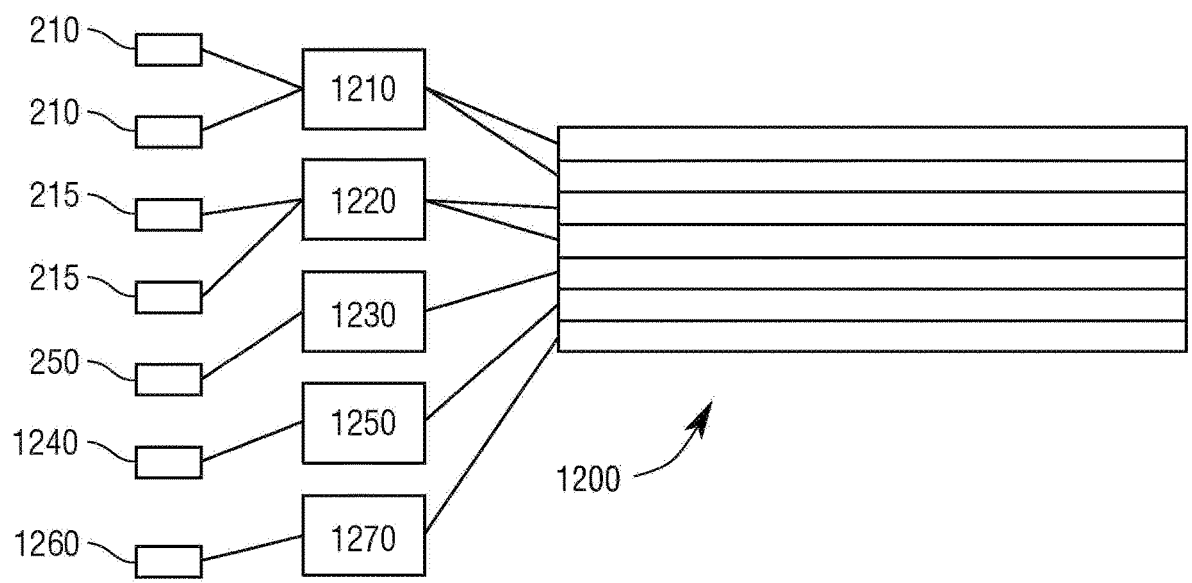
FIG. 12 is a depiction of one embodiment of sources of event data and processing into a combined record.

With reference now to FIG. 12, a representation of a combined event record 1200 is shown. The record 1200 may include separate "tracks" for each data source. For example, fixed cameras 210 may each provide video streams to a video processing logic 1210 that process and if needed synchronize the video streams. In one embodiment, processing logic 1210 may provide the processed streams as two tracks in the event record 1200 as shown. Continuing the example, spectator cameras 215 may provide image, video or sound to spectator processing logic 1220 that may process the data and synchronize its placement in respective tracks in the combined record 1200. Similarly, instructor tagging apparatus 250 may provide its markings, audio, statistics etc. to tagging logic 1230 for synchronized placement in the combined record 1200. Other tracks may be added in real-time such as clock information 1240, scoreboard images, announcer commentary, or other real-time data sources and processed by real-time processing logic 1250 while still other tracks may be added in post-event analysis or teaching preparation such as telestration data 1260 processed by, for example, telestration logic 1270.

Figure 13:
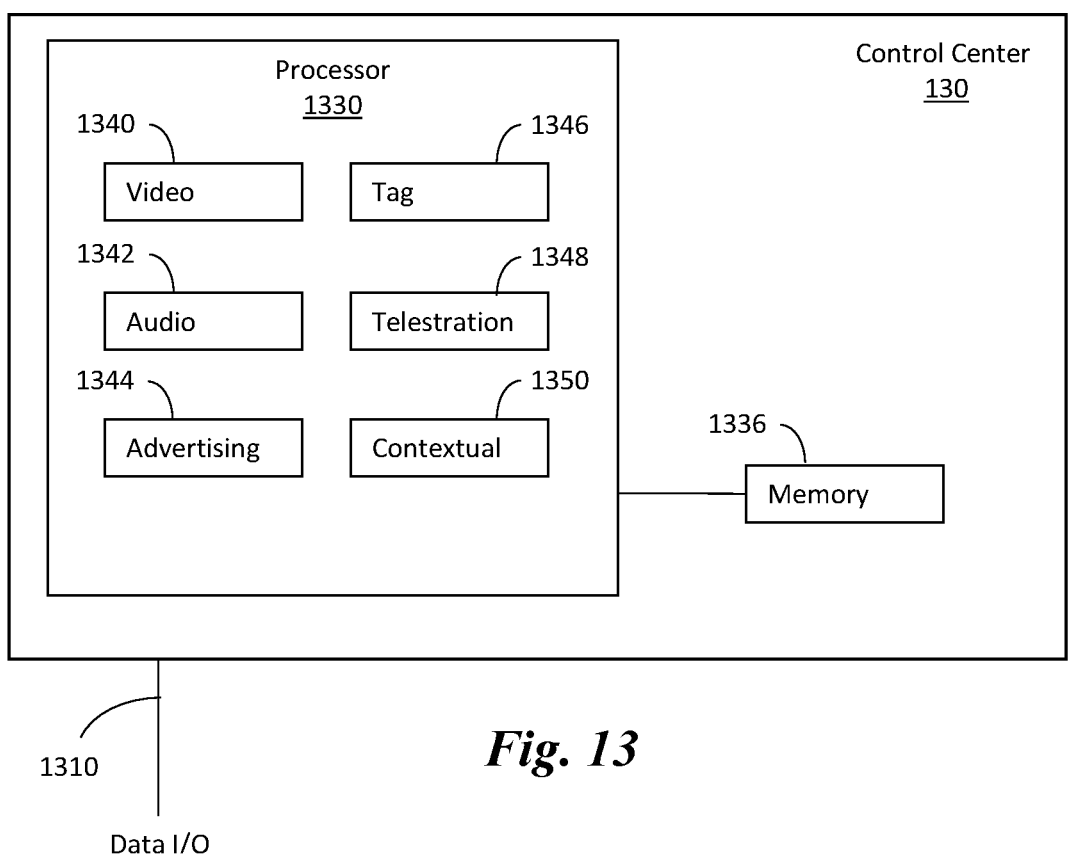
FIG. 13 is a functional block diagram of an exemplary control center.

With reference now to FIG. 13, a simplified functional block diagram of an exemplary control center 130 is illustrated. The control center 130 may be configured with an input output 1310 providing audio, video and data stream(s) to a processor 1330. In the illustrated embodiment, the processor 1330 includes a memory 1336 to store streams, tags, advertising, financial and other information as well as including various sub-processing resources, including, but not limited to, video processing 1340, audio processing 1342, advertising processing 1344, tag processing 1346, telestration processing 1348, contextual data processing 1350. In addition to video processing discussed above, in embodiments video processing 1340 includes compression, synchronization of multiple video streams, selection of a preferred video stream, textual overlay of video stream, and/or analytic computation algorithms. For one example, a computation algorithm may calculate ball or puck speed, player speed, trajectory, "hang time" and the like for actions over a period of time and captured on the video stream. In addition to audio processing discussed above, in embodiments, audio processing 1342 includes compression, synchronization of multiple audio streams, selection of a preferred audio stream, setting levels or otherwise audio production of multiple audio streams, and the like. For one example, an audio production algorithm may set a primary, higher, level for an announcer's audio stream, and a background, lower, level for an audio stream of sounds captured in the area of interest. In addition to advertising processing discussed above, in embodiments advertising processing 1344, includes inserting alternate audio and/or video into a stream. For one example, upon receiving a stoppage of play indication, the advertising algorithm may select a replay of a recent play or activity from the area of interest, and/or depict or announce or both an advertisement from a sponsor or promote concession sales of food, beverage or merchandise available at the venue. In addition to tag processing discussed above, in embodiments tag processing 1346 includes algorithmic analysis of a video stream to identify a feature or features of the video stream and create machine generated tags. For one example, individual participants in the live event may be identified by an identifier such as jersey numbers and/or color schemes, facial or body recognition, or other identification resources used alone or in connection with others, including, for example, "learning" from a user supplied "roster" of player names and associated identifiers so that player names may be stored and used for later searching ease. In another example, an identifiable feature may include a particular situation, such as a play that results in a score, or a loss of possession, or penalty and a feature tag generated to identify the situation(s). In addition to telestration processing discussed above, in embodiments telestration processing 1348 includes "highlighting" a particular participant or participants involved in an activity. For one example, for a particular play the highlighted participant(s) are distinguished from others in the area of interest for a period of time to illustrate their participation in the particular activity or play being viewed. In addition to contextual processing described above, in embodiments contextual processing 1350 includes context for the event, a team or an individual participant. For one example, contextual information may be retrieved, or user provided, such as event date, location, teams, team records, standings and the like. In another example, contextual information may include situational information such as possession, power play, man up, penalty times, shot clock, play clock, pitches, player stats, turnovers, shots, saves and the like.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. For example, other features for such a system include but are not limited to, music and dance recitals, church events such as baptisms, weddings, confirmations, school events such as plays, and concerts. Essentially any area of interest where people perform is a potential venue. Additionally, the features and description may find a reception from broadcast/cable TV stations, other news sources, and internet content sources. In an example the system may charge (including one-time fee, subscription, advertising based, or a combination) for use of event footage. Additionally, independent trainers and coaches may choose to use the captured video to aid them and their clients in analysis of performance techniques. In other uses, the system may provide a "pay per view" type of network, where by anyone could view any event for a fee. This pay per view service, as well as other services described may be delivered through any medium, such as cable, internet, broadcast, or satellite systems. Therefore, the invention is not limited to the specific details, the representative apparatus, and illustrative examples shown and described. Rather, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employ e d in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

I claim:

1. A computer implemented method for adding content to a video stream, where at least a portion of the method is performed by a computing device comprising at least one processor, the method comprising:

Receiving a video stream of an event occurring in an area of interest from at least one camera mounted in view of the area of interest;

Receiving a tagging signal representative of an activity occurring in the area of interest, the tagging signal initiated by a user located in view of the area of interest interacting with a device that displays icons on a user interface, where the icons correspond to a plurality of potential tagging events that may occur in the area of interest;

Detecting an identifiable feature occurring in the area of interest and generating a feature tag based on the detected identifiable feature;

Arranging the tagging signal, the feature tag and the video stream together into a combined event stream; and Saving the combined event stream.

2. The method as set forth in claim 1, further comprising:

Obtaining contextual information of the event; and

Adding the contextual information to the combined event stream.

3. The method as set forth in claim 2, where the obtaining step comprises receiving an image of a scoreboard.

4. The method as set forth in claim 1, where the detecting an identifiable feature comprises detecting a player identifier.

5. The method as set forth in claim 1, where the detecting an identifiable feature comprises detecting status of the event where the status includes play start and play stoppage.

6. The method as set forth in claim 5, further comprising, upon detecting a play stoppage status, inserting advertising into the combined event stream.

7. The method as set forth in claim 1, further comprising replaying the combined the combined event stream.

8. The method as set forth in claim 7, further comprising:

receiving a desired tagging signal; and replaying portions of the combined event stream corresponding to the desired tagging signal.

9. The method as set forth in claim 7, further comprising:

receiving a desired feature tag; and replaying portions of the combined event stream corresponding to the desired feature tag.

10. A computer-based system for adding content to a video stream, the system including a processor comprising:

A video processing section in data communication with at least one camera, the video processing section executing computer-readable code to receive a video stream of an event occurring in an area of interest from at least one camera mounted in view of the area of interest;

A tag processing section in data communication with a device, the tag processing section executing computer-readable code to receive from the device a tagging signal representative of an activity occurring in the area of interest, the tagging signal initiated by a user located in view of the area of interest interacting with the device displaying icons on a user interface, where the icons correspond to a plurality of potential tagging events that may occur in the area of interest;

A feature tag processing section executing computer-readable code to detect an identifiable feature occurring in the area of interest from the video stream and generating a feature tag based on the detected identifiable feature;

A processor executing computer-readable code to arrange the tagging signal, the feature tag and the video stream together into a combined event stream; and A storage device to save the combined event stream.

11. The system as set forth in claim 10, further comprising a context processing section executing computer-readable code to obtain contextual information of the event and add the contextual information to the combined event stream.

12. The system as set forth in claim 11, where the contextual information comprises an image of a scoreboard.

13. The system as set forth in claim 11, where the contextual information comprises situational information.

14. The system as set forth in claim 10, where the identifiable feature comprises a player identifier.

15. The system as set forth in claim 10, where the identifiable feature comprises play stoppage.

16. The system as set forth in claim 10, further comprising a replay processing section executing computer-readable code to replay portions of the combined event stream corresponding to a desired tagging signal and a desired feature tag.

17. An article of manufacture embodied in a non-transitory computer-readable medium for associating tags received from a user during a live event, feature tags representative of a computer identified feature in the live event and a video capture of the live event, the article of manufacture comprising:

first computer executable instructions for causing a device to display on a user interface a plurality of buttons where the buttons correspond to various potential activities occurring during the live event;

second computer executable instructions for causing the device to detect user interaction with at least one of the buttons representing a potential activity and generating a tag based on the user interaction;

third computer executable instructions for detecting an identifiable feature in the area of interest from a video stream and generating a feature tag based on the identifiable feature; and fourth computer executable instructions for correlating the tag, the feature tag and the video stream into a combined data stream.

18. The article of manufacture as set forth in claim 17, the article of manufacture further comprising fifth computer executable instructions for obtaining contextual information related to the event and adding the contextual information to the combined event stream.

19. The article of manufacture as set forth in claim 17, the article of manufacture further comprising sixth computer executable instructions for inserting advertising into the combined event stream upon determination of a play stoppage.

* * * * *